US012800287B2

(12) United States Patent
Wu et al.

(10) Patent No.: US 12,800,287 B2
(45) Date of Patent: Nov. 17, 2026

(54) DEVICE, METHOD, AND SYSTEM FOR DETECTING ROTATION ANGLE IN ELECTRONIC EQUIPMENT

(71) Applicant: CHIPSEMI SEMICONDUCTOR (NINGBO) CO., LTD., Ningbo (CN)

(72) Inventors: Yibin Wu, Ningbo (CN); Bo Xia, Ningbo (CN); Jui-Ming Ni, Ningbo (CN); Yaoguo Zhang, Ningbo (CN); Yulin Zhang, Ningbo (CN)

( * ) Notice: Subject to any disclaimer, the term of this patent is extended or adjusted under 35 U.S.C. 154(b) by 207 days.

(21) Appl. No.: 18/972,952

(22) Filed: Dec. 7, 2024

(65) Prior Publication Data

US 2025/0102288 A1 Mar. 27, 2025

Related U.S. Application Data

(63) Continuation of application No. PCT/US2023/089563, filed on Apr. 20, 2023.

(30) Foreign Application Priority Data

Oct. 17, 2022 (CN) ........................ 202211265521.0

(51) Int. Cl.
*G01B 7/30* (2006.01)

(52) U.S. Cl.
CPC ..................................... *G01B 7/30* (2013.01)

(58) Field of Classification Search
CPC ............................... G01B 7/30; G01D 5/2415
(Continued)

(56) References Cited

U.S. PATENT DOCUMENTS 5,109,193 A * 4/1992 Pike ....................... G01D 5/202
324/207.13
5,311,666 A * 5/1994 Jacobsen .............. G01D 5/2415
33/1 PT (Continued)

FOREIGN PATENT DOCUMENTS

CN 114636369 A 6/2022
CN 115342723 A 11/2022

(Continued)

OTHER PUBLICATIONS

The international search report received in the counterpart international application PCT/CN2023/089563, mailed on Jun. 21, 2023.

*Primary Examiner* — George B Bennett

(57) ABSTRACT

An angle detection apparatus, method, and electronic device for detecting the rotational angle of an axis are disclosed. The apparatus comprises: a first electrode plate on a first plane; second and third electrode plates on a parallel plane, each being of equal size, sharing a common center, and shaped as ring sectors. A dielectric material is positioned between the planes, with its rotational axis perpendicular to the planes and aligned with the center of the ring sectors. The dielectric material's projection on each electrode plate forms a ring sector with matching center and diameters. A capacitance detection chip connects to the three electrode plates to measure the ratio between capacitances detected across the first-second and first-third electrode plates. Changes in this capacitance ratio over time indicate the rotational angle of the dielectric material's axis.

16 Claims, 4 Drawing Sheets

(58) Field of Classification Search
USPC .......................................................... 33/1 PT
See application file for complete search history.

(56) References Cited

U.S. PATENT DOCUMENTS

| | | | | | |
|---|---|---|---|---|---|
| 5,598,153 | A * | 1/1997 | Brasseur | G01B 7/30 324/660 |
| 6,170,162 | B1 * | 1/2001 | Jacobsen | G01D 5/2415 33/1 PT |
| 6,483,321 | B2 * | 11/2002 | Brasseur | G01B 7/30 340/870.37 |
| 8,093,915 | B2 * | 1/2012 | Li | G01D 5/2415 324/686 |
| 8,847,611 | B2 * | 9/2014 | Ulmen | G01D 5/2415 324/681 |
| 11,604,081 | B2 * | 3/2023 | Bondar | H10N 52/101 |
| 12,015,401 | B2 * | 6/2024 | Forster | G05G 5/05 |
| 2013/0021023 | A1 * | 1/2013 | Niwa | G01D 5/202 324/207.15 |
| 2016/0097657 | A1 * | 4/2016 | Borgiani | G01D 5/2415 324/686 |
| 2017/0052025 | A1 | 2/2017 | Hu et al. | |
| 2021/0270593 | A1 * | 9/2021 | Mann | G01D 3/02 |

FOREIGN PATENT DOCUMENTS

| | | | | |
|---|---|---|---|---|
| JP | H0791907 | A | 4/1995 | |
| WO | WO-2017090146 | A1 * | 6/2017 | G01D 5/145 |
| WO | WO-2026021063 | A1 * | 1/2026 | G01B 7/30 |

* cited by examiner

DEVICE, METHOD, AND SYSTEM FOR DETECTING ROTATION ANGLE IN ELECTRONIC EQUIPMENT

CROSS REFERENCE TO RELATED APPLICATIONS

This application is a continuation of International Application No. PCT/CN2023/089563, filed on Apr. 20, 2023, which claims the benefit of the Chinese patent application with application number 202211265521.0, filed on Oct. 17, 2022, the disclosure of which is herein incorporated by reference in its entirety for all purposes.

TECHNICAL FIELD

The present application relates to the field of rotational angle measurement, specifically to a rotation angle detection device, method, and electronic system.

BACKGROUND

Accurately measuring the rotation angle of an axis is essential in various applications, including potentiometers, trigger buttons, foldable devices, and servo motors. One widely adopted technique for achieving this involves a detection structure comprising a magnet and a Hall sensor. As the axis rotates, changes in direction and angle affect the relative position between the magnet and the Hall sensor, enabling the rotation angle to be measured through variations in the Hall sensor's analog signal output.

Despite its utility, this method faces specific technical challenges. For instance, external magnetic fields can interfere with the accuracy of angle measurements. Additionally, thermal expansion and contraction due to environmental temperature changes, as well as component aging, can alter the distance between the magnet and the Hall sensor. Such variations can lead to deviations in the Hall sensor's signal precision, ultimately impacting the accuracy of the axis rotation angle measurements.

SUMMARY

To solve the above technical problems The present application discloses a device and method for detecting the rotational angle of an axis by utilizing capacitive sensing. The claimed device comprises a capacitance detection chip, a first electrode plate, a second electrode plate, a third electrode plate, and a dielectric material. The first electrode plate is in a first plane, while the second and third electrode plates are in a second plane parallel to the first. The dielectric material is in a third plane, which third plane is parallel to the first plane and situated between the first and second planes.

In this design, the second electrode plate forms a first ring sector, and the third electrode plate forms a second ring sector, both of equal size and sharing a common center. The rotation axis of the dielectric material is aligned perpendicularly to the third plane and passes through the center of the second ring sector. When the dielectric material is projected onto the second and third electrode plates, it forms a third ring sector on the second electrode plate and a fourth ring sector on the third electrode plate. These ring sectors have matching inner and outer diameters and share the same center as the second ring sector.

The capacitance detection chip is connected to the first, second, and third electrode plates and measures the ratio between two capacitance values: a first capacitance between the first and second electrode plates and a second capacitance between the first and third electrode plates. By analyzing the detected ratio and its variation from a previous measurement, the claimed device determines the rotational angle of the dielectric material's axis.

The application also provides a method for detecting the rotational angle of an axis. This method involves measuring the ratio of the first and second capacitance values, where these capacitance values reflect the position of the dielectric material relative to the electrode plates across the defined planes. The rotational angle is determined from changes in the capacitance ratio.

Additionally, embodiments include an electronic device incorporating this rotational angle detection apparatus. In certain embodiments, the first electrode plate may be configured as a fifth ring sector, with its center aligned on the rotational axis and inner and outer diameters identical to those of the first ring sector. In other embodiments, the dielectric material may be configured as a sixth ring sector, similarly centered on the rotation axis and matching the inner and outer diameters of the first ring sector.

Some embodiments also enable the capacitance detection chip to determine the rotational direction of the dielectric material's axis by monitoring changes in the capacitance ratio. This device and method allow for precise detection of the rotational angle and direction of an axis, providing robust sensing capabilities for applications requiring accurate angular positioning.

BRIEF DESCRIPTION OF THE DRAWINGS

The accompanying figures (FIGS.) illustrate embodiments and explain principles of the disclosed invention. It is to be understood, however, that these figures are presented for purposes of illustration only, and not for defining limits of relevant applications.

DETAILED DESCRIPTION OF THE INVENTION

The objective of this application is to provide an advanced rotation angle detection device, a corresponding method, and electronic equipment, aiming to ensure high accuracy in the detection of rotation angles and to enhance reliability across a variety of operating conditions.

To make the objectives, technical solutions, and advantages of this application clearer, the various embodiments of this application will be described in detail below with reference to the accompanying drawings. However, it is understood by those skilled in the art that numerous technical details have been provided in the embodiments to help readers better understand the application. Nevertheless, the technical solutions claimed in this application can still be realized without these technical details and based on various changes and modifications to the following embodiments. The division of the following embodiments is for convenience of description and should not be construed to limit the scope of the invention disclosed in this application. Each embodiment can be combined and referenced with each other if there is no contradiction.

Figure 1:
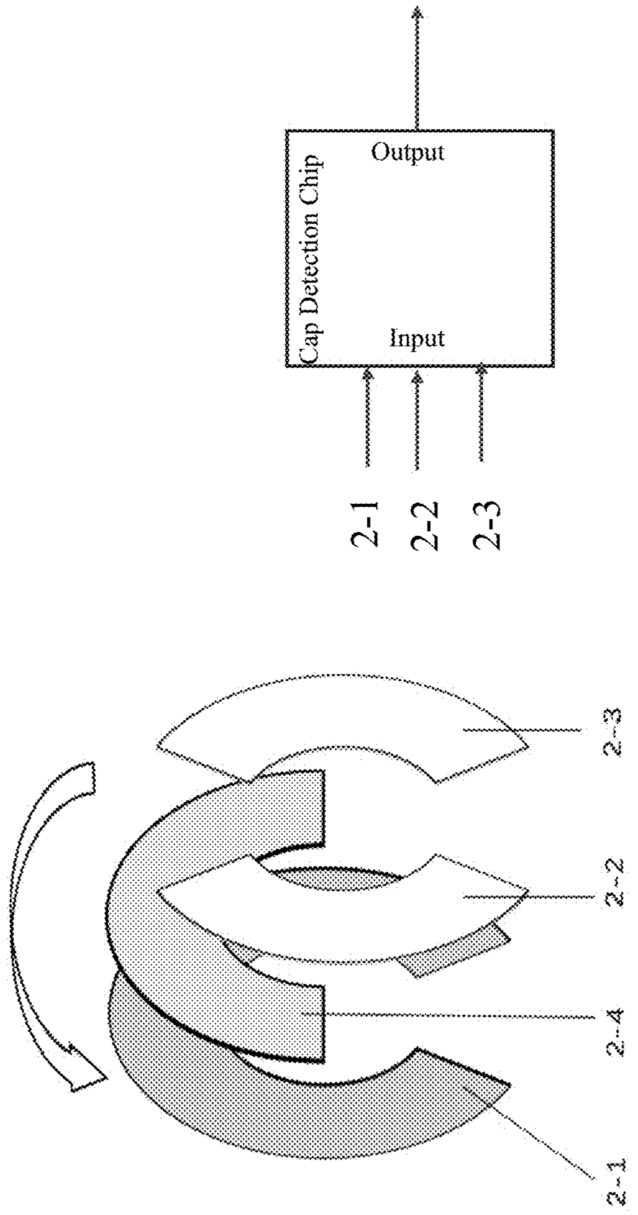
FIG. 1 illustrates a structural schematic of a axial rotation angle detection device according to one embodiment of the present application, showing the general arrangement of components.

FIG. 1 illustrates a structural schematic of a axial rotation angle detection device according to one embodiment of the present application, showing the general arrangement of components. As shown in FIG. 1, the rotation angle detection device described here comprises several components arranged in a specific structural configuration. This device includes:

1. Capacitance Detection Chip (10): This component detects changes in capacitance, which are interpreted to determine the angle of rotation.
2. First Electrode Plate (2-1): in a defined first plane, this electrode plate plays a pivotal role in measuring angle shifts.
3. Second Electrode Plate (2-2) and Third Electrode Plate (2-3): These plates are in a second plane parallel to the first, ensuring that measurements reflect angle changes without interference from movements perpendicular to the rotation axis.
4. Dielectric Material (2-4): This material is in a third plane, parallel to the first, and positioned between the first and second planes. This setup stabilizes capacitance readings against environmental factors, contributing to a robust detection system less prone to errors from thermal expansion.

Since the second electrode plate 2-2 and the third electrode plate 2-3 are in the same plane, they are equidistant from the first plane. Furthermore, if the distance between the first and second planes changes due to thermal expansion, contraction, or hardware structural variations, the system ensures that the distance between the second electrode plate 2-2 and third electrode plate 2-3 to the first plane remains equal. Consequently, the inter-plate distance $d_1$ between the first electrode plate 2-1 and the second electrode plate 2-2 and the inter-plate distance $d_2$ between the first electrode plate 2-1 and the third electrode plate 2-3 are always equal (refer to the axial rotation angle detection device structure illustration shown in FIG. 2 for d).

Moreover, the dielectric material between the first electrode plate 2-1 and the second electrode plate 2-2 is identical to that between the first electrode plate 2-1 and the third electrode plate 2-3, labeled as dielectric 2-4. Therefore, the capacitance ratio $C_1/C_2$, where $C_1$ is the capacitance between the first electrode plate 2-1 and the second electrode plate 2-2 and $C_2$ is the capacitance between the first electrode plate 2-1 and the third electrode plate 2-3, can be expressed as $$C_1/C_2 = \frac{\frac{\varepsilon S1}{4\pi k d1}}{\frac{\varepsilon S2}{4\pi k d2}} = S_1/S_2.$$

($S_1$ and $S_2$ are explained below as to FIG. 3). This arrangement allows the subsequent capacitor detection chip to determine the rotation angle of dielectric material by detecting the capacitance ratio.

The second electrode plate 2-2 forms the first ring sector, while the third electrode plate 2-3 forms the second ring sector. Both ring sectors are identical in size and share the same center. As illustrated in FIG. 1, the shapes of the second electrode plate 2-2 and the third electrode plate 2-3 are both ring sectors, equal in size and centered alike.

Figure 2:
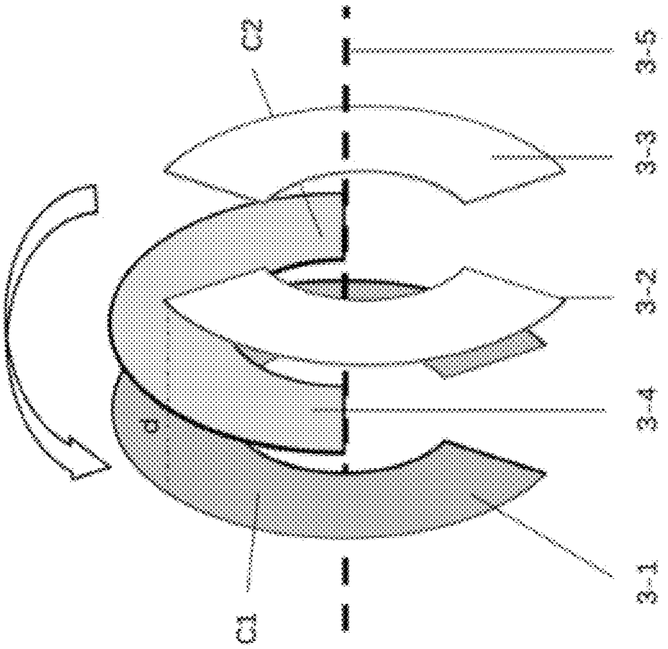
FIG. 2 provides a detailed structural schematic of a portion of the axial rotation angle detection device as per one embodiment of the present application, highlighting the specific configuration of key components.

The rotational axis of dielectric 2-4 is a line perpendicular to the third plane and passing through the center of the second ring sector. For a more detailed description, refer to the axial rotation angle detection device's structural diagram shown in FIG. 2. In FIG. 2, line 3-5 represents the rotation axis of dielectric 3-4. The detection device described in this example detects the rotation angle of dielectric 3-4 about the rotational axis 3-5. Additionally, in FIG. 2, the first, second, and third electrode plates are labeled 3-1, 3-2, and 3-3, respectively, while the dielectric is labeled 3-4.

In another example, as depicted in FIGS. 1 and 2, the first electrode plate 2-1 can also be a ring sector. In this case, the first electrode plate 2-1 forms a fifth ring sector, with its center located on the rotation axis 3-5. The fifth ring sector's inner and outer diameters match those of the first ring sector. Thus, in some instances, the fifth ring sector's center is effectively the intersection of the rotation axis 3-5 and the first plane.

The inner diameter of the first electrode plate 2-1 may also be smaller than that of the second electrode plate 2-2, and its outer diameter larger than that of the second electrode plate 2-2. Provided that the projection of the first electrode plate 2-1 on the second electrode plate 2-2 is no smaller than the area of the second electrode plate 2-2, the opposing area of the capacitor comprising both plates is determined by the area of the second electrode plate 2-2, enabling the desired technical effects. Similarly, the projection of the first electrode plate 2-1 onto the third electrode plate 2-3 should also be no smaller than the area of the third electrode plate 2-3, allowing for a non-sector shape for the first electrode plate 2-1.

Using this configuration for the first electrode plate 2-1 minimizes its area, leading to significant savings in material costs for the first electrode plate 2-1 and consequently reducing the manufacturing costs of the rotation angle detection device.

Dielectric 2-4's projections on the second and third electrode plates, 2-2 and 2-3, respectively, form the third and fourth ring sectors. For further clarification, refer to the front view of the rotation angle detection device in FIG. 3. In FIG. 3, area $S_1$ represents the third ring sector, the projection of dielectric 2-4 on the second electrode plate 2-2, while area $S_2$ represents the fourth ring sector, the projection of dielectric 2-4 on the third electrode plate 2-3.

Figure 3:
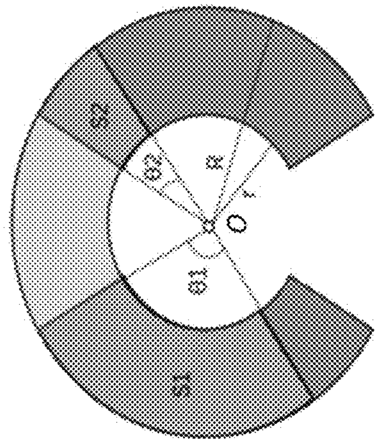
FIG. 3 depicts a front view of a segment of the axial rotation angle detection device in accordance with an embodiment of the present application, offering a clearer perspective on the relative positioning and orientation of parts.

The third and fourth ring sectors share the same center as the second ring sector (see point O in FIG. 3) and have identical inner and outer diameters (see r and R in FIG. 3). Thus, the third ring sector represents the effective area for the first capacitor, which includes the first electrode plate 2-1 and the second electrode plate 2-2, while the fourth ring sector represents the effective area for the second capacitor, which includes the first electrode plate 2-1 and the third electrode plate 2-3. As a result, the capacitance ratio $$\frac{C1}{C2}=\frac{S1}{S2}=\frac{\frac{1}{2}\theta 1(R^2-r^2)}{\frac{1}{2}\theta 2(R^2-r^2)}=\frac{\theta 1}{\theta 2}.$$

The capacitance ratio between the first and second capacitors thus corresponds to the ratio of the central angles of dielectric 2-4's projections on the second and third electrode plates. Therefore, by measuring the ratio between the first and second capacitances, the capacitor detection chip can determine the rotation angle of the dielectric's projection, reflecting the current position of dielectric 2-4.

Additionally, since $$\frac{C1}{C2}=\frac{\theta 1}{\theta 2},$$

this capacitance ratio is unaffected by the distance between the electrode plates or other factors. Hence, if the distance between the first and second planes changes due to temperature-induced expansion or contraction or structural aging, the capacitance ratio remains constant, ensuring the accuracy and reliability of rotation angle detection despite environmental or structural changes.

Furthermore, capacitive detection requires only microampere-level current, resulting in low power consumption. Compared to existing technologies, particularly those utilizing magnets and Hall-effect sensors, this method significantly reduces power consumption in detecting the rotation angle.

This application also discloses a method for detecting rotation angles, as described below.

In one embodiment, the method involves detecting the capacitance ratio between two capacitors. The first capacitance represents the capacitance between the first and second electrode plates, while the second capacitance represents the capacitance between the first and third electrode plates. The first electrode plate lies in a first plane, while the second and third electrode plates are situated in a parallel second plane. A dielectric material is positioned in a third plane, which is parallel to the first plane and located between the first and second planes. The second and third electrode plates form identical ring sectors, centered on a shared point. The rotational axis of the dielectric is perpendicular to the third plane and passes through the center of the second ring sector.

By comparing the detected capacitance ratio between the first and second capacitors with a previously measured capacitance ratio, the rotation angle of the dielectric material can be determined. This method also enables the detection of the direction of rotation by analyzing changes in the capacitance ratio, providing both the rotation angle and direction. This capability is critical for applications that require directional rotation information.

Figure 4:
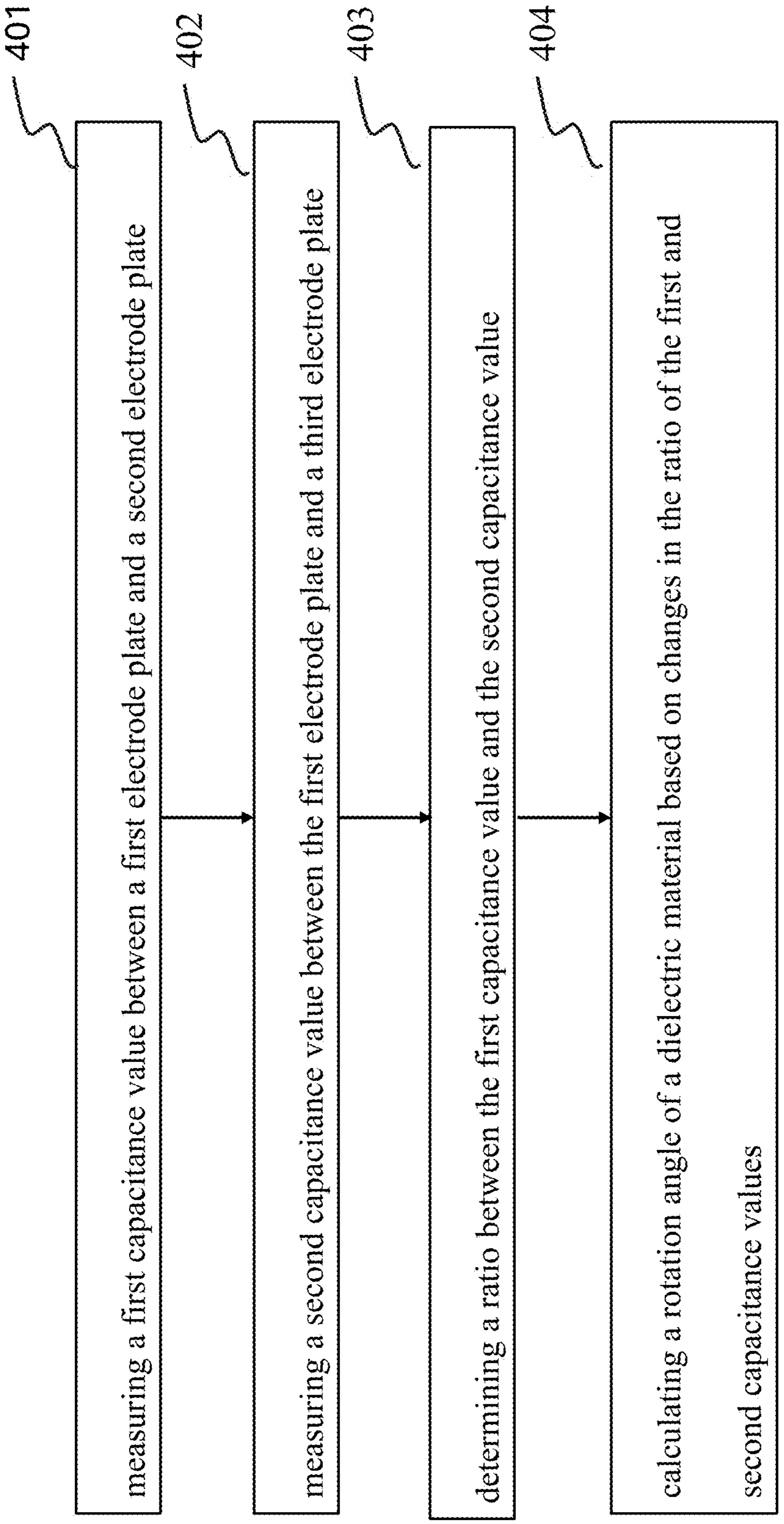
FIG. 4 presents a flowchart that outlines the steps of the axial rotation angle detection method based on one embodiment of the present application, illustrating the sequential process involved in the method.

FIG. 4 illustrates the steps of the method for detecting the rotation angle of an axis, enhancing understanding of its implementation. However, these details are not required to practice the method.

Step 401: Measure and record the first capacitance value between the first and second electrode plates.

Step 402: Measure and record the second capacitance value between the first and third electrode plates. The first electrode plate lies in the first plane, while the second and third electrode plates lie in a parallel second plane. The dielectric is in a third plane, parallel to and between the first and second planes.

In this configuration, the second electrode plate forms a first ring sector, and the third electrode plate forms a second ring sector. Both ring sectors have identical dimensions and share the same center. The rotation axis of the dielectric is perpendicular to the third plane and intersects the center of the second ring sector. The projection of the dielectric onto the second electrode plate forms a third ring sector, while its projection onto the third electrode plate forms a fourth ring sector. Both the third and fourth ring sectors share the same center and have equal inner and outer diameters as the second ring sector.

For clarity, detailed descriptions of the first, second, and third electrode plates, as well as the dielectric, were provided in previous examples and are not repeated here to avoid redundancy.

Step 403: Determine the ratio between the first capacitance value (from Step 401) and the second capacitance value (from Step 402).

Step 404: Calculate the rotation angle of the dielectric's axis based on the change in this capacitance ratio compared to a previous measurement.

This structured method enables precise detection of both the rotation angle and direction, supporting a wide range of practical applications.

Specifically, because the second and third electrode plates are in the same plane, the distance $d_1$ (between the first and second electrode plates) is equal to $d_2$ (between the first and third electrode plates). Additionally, both capacitance values correspond to the same dielectric (meaning they share the same dielectric constant, ε), resulting in a ratio of $$\frac{C1}{C2}=\frac{\frac{\varepsilon S1}{4\pi kd1}}{\frac{\varepsilon S2}{4\pi kd2}}=\frac{S1}{S2}.$$

The projections of the dielectric on the second and third electrode plates correspond to the effective areas related to the first and second capacitance values, respectively.

Since the projections of the dielectric on the second and third electrode plates form ring sectors with equal inner and outer diameters, the area ratio of $$\frac{S1}{S2}=\frac{\frac{1}{2}\theta 1(R^2-r^2)}{\frac{1}{2}\theta 2(R^2-r^2)}=\frac{\theta 1}{\theta 2}.$$

Thus, the ratio of the first capacitance value to the second capacitance value reflects the ratio of the central angles of the dielectric projections on the two electrode plates. In other words, detecting the ratio of the first and second capacitance values is equivalent to detecting the ratio of the central angles of the projections. Since the central angle ratio reflects the current position of the dielectric, this step enables the detection of the axis rotation angle by monitoring changes in the capacitance ratio.

Various methods may be used to detect the axis rotation angle based on changes in the capacitance ratio. For example, the angle may be determined by comparing the current capacitance ratio with a previously stored reference ratio. This method may include retrieving the rotation angle corresponding to the detected ratio from a pre-stored ratio-angle relationship, then calculating the difference between this angle and the previously detected angle to obtain the axis rotation angle of the dielectric.

In this example, the ratio-angle relationship is pre-stored, possibly in flash memory within a capacitance detection chip or similar storage module. For instance, in the rotation angle detection device shown in FIG. 3, a ratio of 1 corresponds to a rotation angle of 0 degree, while a ratio of 3 corresponds to a rotation angle of 30 degrees. This correspondence may be pre-stored in a table format or other forms. In this way, the detected ratio can be directly mapped to the corresponding rotation angle using the pre-stored reference, and the difference between two consecutive angles can provide the axis rotation angle. This method allows for efficient and rapid angle detection.

In an example where the dielectric forms a ring sector centered on the rotation axis, the axis rotation angle can also be determined based on changes in the capacitance ratio, involving the central angles of the dielectric and the second and third electrode plates. By calculating the rotation angles corresponding to the current and previous capacitance ratios, the axis rotation angle can be derived from the difference.

In a specific example, if the dielectric's central angle is 180 degrees, and the central angle of both the second and third electrode plates is 120 degrees, a capacitance ratio of 1 corresponds to a rotation angle of 0 degrees, while a ratio of 3 corresponds to a rotation angle of 30 degrees. Therefore, the axis rotation angle of the dielectric is 30 degrees.

It should be noted that the rotation direction of the dielectric may also be detected to meet directional detection requirements in practical applications. For instance, after determining the axis rotation angle, if the current capacitance ratio is greater than the previous ratio, the rotation direction can be set as a first predetermined direction. Conversely, if the current ratio is less than the previous one, the direction can be set as a second predetermined direction.

In this example, the first direction could be counterclockwise, while the second direction would then be clockwise. In another configuration, these directions could be reversed as per specific application requirements.

Additionally, after determining the axis rotation angle, the previous capacitance ratio may be updated to facilitate the next angle detection cycle, making the current capacitance ratio the baseline for subsequent measurements.

It should be noted that the technical details and effects described in the previous examples are applicable to this example, and therefore are not repeated here to avoid redundancy.

Since the second and third electrode plates are in the same plane, the distances $d_1$ and $d_2$ are equal, and both capacitance values correspond to the same dielectric, with equal dielectric constants ε. Thus, the ratio of $$\frac{C1}{C2} = \frac{\frac{\varepsilon S1}{4\pi k d1}}{\frac{\varepsilon S2}{4\pi k d2}} = \frac{S1}{S2},$$

and the projected area ratio provides the relevant ratio of the dielectric projections on the two plates. In other words, the ratio of the first capacitance value to the second capacitance value is equal to the ratio of the central angles of the third ring sector and the fourth ring sector. Therefore, this ratio reflects the central angle of the dielectric's projected area, which indicates the current position of the dielectric. Consequently, in this invention, the capacitance detection chip can determine the positional change of the dielectric—that is, the rotation angle of the dielectric's axis—based on changes in the capacitance ratio.

Additionally, because $$\frac{C1}{C2} = \frac{\theta 1}{\theta 2},$$

it can be determined that the ratio of the first capacitance to the second capacitance is independent of factors such as the distance between electrode plates. Thus, even if the distance between the first and second planes changes due to thermal expansion, contraction of device parts, or structural aging, the ratio between the first and second capacitances remains constant. Consequently, determining the rotation angle by using the ratio of the first and second capacitances avoids the influence of temperature fluctuations and changes in hardware structure, thereby ensuring the accuracy and reliability of rotation angle detection.

Furthermore, the power consumption generated during capacitance detection is very low. Compared to related technologies, particularly those that detect rotation angles using magnets and Hall sensors, the technique of determining the rotation angle through capacitance ratio detection achieves significantly reduced power consumption.

An embodiment of this application involves an electronic device comprising an axial rotation angle detection apparatus as described above. Understandably, the electronic device disclosed in this embodiment can be a foldable smartphone, foldable tablet, or other foldable smart device, as well as electronic equipment like servo motors that require axial rotation angle detection.

This electronic device embodiment includes the functional modules and advantageous features described in the axial rotation angle detection apparatus, and thus, to avoid redundancy, those details are not repeated here. For further technical specifics not described in this embodiment, refer to the axial rotation angle detection apparatus provided in this application.

The above embodiment is provided to enable and illustrate the implementation of this invention for those skilled in the art. Variations and modifications may be made by those skilled in the art without departing from the inventive concept of this application. Therefore, the scope of protection of this application should not be limited to the above embodiment but should be construed broadly to encompass the full range of innovative features described in the claims.

What is claimed is:

1. A rotation angle detection device, comprising:

a first electrode plate, wherein the first electrode plate is in a first plane;

a second electrode plate, wherein the second electrode plate is in a second plane which is parallel to the first plane, and wherein the second electrode plate forms a first ring sector;

a third electrode plate, wherein third electrode plate is also in the second plane and forms a second ring sector, wherein the first ring sector and the second ring sector are of equal size, and the first ring sector is centered at the same point as the second ring sector;

a dielectric material, wherein the dielectric material is in a third plane parallel to the first plane and located between the first and second planes, and where in a rotation axis of the dielectric material is defined by a line perpendicular to the third plane and passing through center of the second ring sector, and wherein a projection of the dielectric material onto the second electrode plate forms a third ring sector, while a projection of the dielectric material onto the third electrode plate forms a fourth ring sector, the third ring sector and the fourth ring sector having a center aligned with the center of the second ring sector, and the third ring sector and the fourth ring sector having equal inner diameters and equal outer diameters; and a capacitance detection chip, wherein each of the first electrode plate, the second electrode plate, and the third electrode plate has an output electrically connected to an input terminal of the capacitance detection chip, and the capacitance detection chip is configured to determine a rotation angle of the rotation axis of the dielectric material.

2. The rotation angle detection device of claim 1, wherein the capacitance detection chip determines the rotation angle based on changes in a ratio of a first capacitance value to a second capacitance value, wherein the first capacitance value is a capacitance between the first electrode plate and the second electrode plate, and the second capacitance value is a capacitance between the first electrode plate and the third electrode plate.

3. The rotation angle detection device of claim 1, wherein the first electrode plate forms a fifth ring sector, the fifth ring sector being centered on the rotation axis, and wherein the fifth ring sector has an inner diameter equal to the inner diameter of the first ring sector and an outer diameter equal to the outer diameter of the first ring sector.

4. The rotation angle detection device of claim 1, wherein the dielectric material forms a sixth ring sector, the sixth ring sector being centered on the rotation axis, and wherein the sixth ring sector has an inner diameter equal to the inner diameter of the first ring sector and an outer diameter equal to the outer diameter of the first ring sector.

5. The rotation angle detection device of claim 2, wherein the capacitance detection chip is further configured to determine rotational direction of the rotation axis of the dielectric material based on changes in the ratio of the first and second capacitance values.

6. A rotation angle detection method, comprising:

measuring a first capacitance value between a first electrode plate and a second electrode plate;

measuring a second capacitance value between the first electrode plate and a third electrode plate;

determining a ratio between the first capacitance value and the second capacitance value; and calculating a rotation angle of a dielectric material based on changes in the ratio of the first and second capacitance values.

7. The method of claim 6, wherein the first electrode plate is in a first plane, and the second electrode plate and the third electrode plate are in a second plane parallel to the first plane.

8. The method of claim 7, wherein the dielectric material is in a third plane parallel to the first plane and positioned between the first plane and the second plane.

9. The method of claim 8, wherein the second electrode plate forms a first ring sector, and the third electrode plate forms a second ring sector, the first ring sector and the second ring sector being centered on a shared center point and having the same inner and outer diameters.

10. The method of claim 9, wherein a rotation axis of the dielectric material is perpendicular to the third plane and passes through the shared center point.

11. The method of claim 10, wherein a projection of the dielectric material onto the second electrode plate forms a third ring sector, and a projection onto the third electrode plate forms a fourth ring sector, the third ring sector and the fourth ring sector being centered on the shared center point and having equal inner and outer diameters.

12. The method of claim 6, wherein determining the rotation angle of the dielectric material based on changes in the ratio of the first capacitance value and the second capacitance value comprises retrieving a first rotation angle and a second rotation angle from a stored data structure that maps capacitance ratio values to rotation angles, and calculating a difference between the first rotation angle and the second rotation angle.

13. The method of claim 9, wherein a rotation axis of the dielectric material is defined by a line perpendicular to the third plane and passing through center of the second ring sector and the dielectric material is configured as a ring sector centered on the rotation axis, and wherein determining rotation angle of the dielectric material comprises calculating a first rotation angle and a second rotation angle based on central angles of the dielectric material, the second electrode plate, and the third electrode plate, and determining the rotation angle of the dielectric material based on the first rotation angle and the second rotation angle.

14. The method of claim 6, further comprising determining rotational direction of rotation axis of the dielectric material based on changes in the ratio of the first capacitance value and the second capacitance value.

15. The method of claim 14, further comprising: identifying the rotational direction as a first direction if the ratio of the first capacitance value to the second capacitance value is greater than a pre-determined ratio value, and identifying the rotational direction as a second direction if the ratio is less than the pre-determined ratio value.

16. The method of claim 6, further comprising storing the determined ratio of the first capacitance value and the second capacitance value for future comparison.

* * * * *